(12) United States Patent
Schuetz et al.

(10) Patent No.: US 12,545,521 B2
(45) Date of Patent: Feb. 10, 2026

(54) CHAIN LINK, KIT COMPRISING A CHAIN LINK AND CONVEYOR PLATE, AND CHAIN CONVEYOR

(71) Applicant: Schenck Process Europe GmbH, Darmstadt (DE)

(72) Inventors: Andreas Schuetz, Darmstadt (DE); Stefan Goetz, Darmstadt (DE)

(73) Assignee: Qlar Europe GmbH, Darmstadt (DE)

( * ) Notice: Subject to any disclaimer, the term of this patent is extended or adjusted under 35 U.S.C. 154(b) by 113 days.

(21) Appl. No.: 18/402,318

(22) Filed: Jan. 2, 2024

(65) Prior Publication Data

US 2024/0132291 A1 Apr. 25, 2024
US 2024/0228175 A9 Jul. 11, 2024

Related U.S. Application Data

(63) Continuation of application No. PCT/EP2022/068043, filed on Jun. 30, 2022.

(30) Foreign Application Priority Data

Jul. 1, 2021 (DE) .................. 10 2021 117 047.8

(51) Int. Cl.
*B65G 17/02* (2006.01)
*B65G 17/12* (2006.01)
*B65G 17/38* (2006.01)
*B65G 17/42* (2006.01)
*B65G 17/06* (2006.01)

(52) U.S. Cl.
CPC ............ *B65G 17/38* (2013.01); *B65G 17/067* (2013.01)

(58) Field of Classification Search
CPC ........ B65G 17/00; B65G 17/02; B65G 17/12; B65G 17/38; B65G 17/42

USPC ......................................................... 198/851
See application file for complete search history.

(56) References Cited

U.S. PATENT DOCUMENTS

| 1,422,151 | A | * | 7/1922 | Walker | B65G 17/42 198/712 |
|---|---|---|---|---|---|
| 2,955,700 | A | | 10/1960 | Badger | |
| 3,044,604 | A | * | 7/1962 | Steigleder | B65G 17/126 198/701 |

(Continued)

FOREIGN PATENT DOCUMENTS

| DE | 9101113 U1 | 5/1991 |
|---|---|---|
| EP | 0284595 A1 | 9/1988 |

OTHER PUBLICATIONS

International Search Report dated Sep. 30, 2022 in corresponding application PCT/EP2022/068043.

*Primary Examiner* — Douglas A Hess
(74) *Attorney, Agent, or Firm* — Muncy, Geissler, Olds & Lowe, P.C.

(57) ABSTRACT

A chain link for a plate link chain of a chain conveyor, having two disk-shaped side walls that are spaced apart from one another in parallel in a transverse direction of the chain link and fixedly connected to one another. The side walls each include a rabbet having a force transmission surface oriented essentially perpendicularly with respect to a longitudinal direction of the chain link, and the force transmission surface is designed and provided for the direct transmission of force to a conveyor plate of the chain conveyor. A kit comprising such a chain link and a conveyor plate, and a chain conveyor having a plurality of such kits are also provided.

15 Claims, 4 Drawing Sheets

(56) References Cited

U.S. PATENT DOCUMENTS

| | | | | |
|---|---|---|---|---|
| 5,730,280 | A | * | 3/1998 | Dalferth ............... B65G 17/126 198/712 |
| 5,857,558 | A | * | 1/1999 | Irvine .................... B65G 17/42 198/867.14 |
| 6,170,650 | B1 | * | 1/2001 | Morikiyo ............... B62D 65/00 198/465.1 |
| 6,615,974 | B2 | | 9/2003 | Scholz |
| 7,325,674 | B2 | * | 2/2008 | Dufhaus ................ B65G 17/44 198/867.14 |
| 7,377,378 | B2 | * | 5/2008 | Cash, III ................ B65G 17/26 198/803.11 |
| 8,016,103 | B2 | * | 9/2011 | Krischer ................ B65G 17/44 198/853 |
| 8,272,504 | B2 | * | 9/2012 | Neugebauer ......... B65G 19/025 198/867.15 |
| 8,500,101 | B2 | * | 8/2013 | Yaoi ...................... B66F 13/005 254/358 |
| 8,820,520 | B2 | * | 9/2014 | Triesenberg ............ B25B 27/14 198/370.02 |
| 9,248,970 | B2 | * | 2/2016 | Schneider ............ B65G 17/126 |
| 9,290,327 | B2 | * | 3/2016 | Abbestam .............. B65G 17/40 |
| 2024/0010435 | A1 | * | 1/2024 | Schuetz et al. |

\* cited by examiner

CHAIN LINK, KIT COMPRISING A CHAIN LINK AND CONVEYOR PLATE, AND CHAIN CONVEYOR

This nonprovisional application is a continuation of International Application No. PCT/EP2022/068043, which was filed on Jun. 30, 2022, and which claims priority to German Patent Application No. 10 2021 117 047.8, which was filed in Germany on Jul. 1, 2021, and which are both herein incorporated by reference.

BACKGROUND OF THE INVENTION

Field of the Invention

The present invention relates to a chain link for a plate link chain of a chain conveyor, for example, a slat conveyor, having two essentially disk-shaped side walls that are spaced apart from one another in parallel in a transverse direction of the chain link and fixedly connected to one another. The invention further relates to a kit comprising such a chain link and a conveyor plate of a chain conveyor. The invention further relates to a chain conveyor, in particular a slat conveyor, including a plurality of such kits.

Description of the Background Art

In general, a chain conveyor, such as a slat conveyor, is a continuous conveyor for transporting piece goods or bulk materials. Such slat conveyors are used in particular in the heavy load sector for transporting large and/or sharp-edged bulk materials. The slat conveyor includes a plurality of conveyor plates, which may typically have a length of 800 mm to 2000 mm and a width of 100 mm to 300 mm. The conveyor plates are supported on tracks above (nondriven) rollers to allow the high weight of the bulk material to be accommodated. The drive of the slat conveyor takes place via the plate link chain, which is made up of multiple chain links and transmits a tensile force in the chain circulation direction to the individual conveyor plates via the chain links, and thus drives the conveyor plates.

For example, EP 0 284 595 A1 discloses a chain for a chain conveyor, comprising elongated chain links that are arranged in parallel planes and connected to one another by cross bolts, every two neighboring cross bolts being connected to one another by two spaced-apart pairs of plate links to form a plate link member, and each pair of plate links being made up of at least one inner plate link and one outer plate link. In the chain disclosed in EP 0 284 595 A1, the outer plate links are designed as angled plates in which support brackets are bent outwardly by 90° at the outer plate links, so that the chain for driving a conveyor plate is connectable via the support brackets to the conveyor plate to be driven, and in particular is screwable via screws that are inserted in the vertical direction into the conveyor plate and the support brackets. Alternatively, there are chain links in which the side walls/chain links have outwardly protruding support brackets welded thereto, via which the chain for driving the conveyor plate is similarly connectable, i.e., in particular screwable via screws that are inserted in the vertical direction into the conveyor plate and the support brackets. The positions for the screws in the support brackets and the conveyor plates, and thus the position of the force transmission sites, are/is specified in a DIN standard.

However, it is disadvantageous that, on the one hand, when the side walls are fastened to the conveyor plates via corresponding support brackets, the tensile force transmission takes place via a frictionally engaged connection, in the form of a screw connection, between the support bracket and the conveyor plate, as a result of which the maximum transmittable tensile force is limited. On the other hand, the fastening of the support bracket to the side wall has the disadvantage that a weld joint is necessary or the side wall must be bent over. Bending or also welding is not possible for every material, and the fastening site forms a weak point of the chain link at which the risk of breakage is increased.

Furthermore, a chain conveyor for lightweight piece goods is known from U.S. Pat. No. 3,944,059, the conveyor plates of which, at their bottom side, have grooves with which the bent flanges of the side walls engage and are secured via a snap-on connection. However, the conveyor plates are made of a material that has high flexibility in order to facilitate the snap-on operation, since the ease of removal and replacement of the conveyor plates is the primary focus here. Due to the low load-bearing strength, this type of arrangement would therefore be unsuitable for chain links and chain conveyors as in the present invention.

SUMMARY OF THE INVENTION

It is therefore an object of the present invention to avoid or at least reduce the disadvantages from the prior art. In particular, the intent is to increase the load-bearing capacity of a chain link without impairing its functionality, in particular with regard to its mounting on a chain conveyor via force transmission components. In addition, the intent is to simplify the installation of the chain link and to reduce the costs for the chain link.

Thus, for a chain link, an object of the invention is achieved according to the invention in that the disk-shaped or panel-shaped side walls include at least one rabbet at their upper edge, having a force transmission surface oriented essentially perpendicularly with respect to a longitudinal direction (z direction) of the chain link, the force transmission surface being designed and provided for the direct transmission of force to a conveyor plate of the chain conveyor. In other words, an end face of the side wall oriented perpendicularly with respect to the chain circulation direction forms a direct contact surface for the conveyor plate, so that a drive force is transmittable directly to the conveyor plate. Due to the disk-shaped design of the side wall, the transmission of force to the conveyor plate takes place in the plane of the disk of the side wall, so that no torque is induced on either the side wall or the chain link in the transverse direction (x direction) and/or in a chain height direction/vertical direction (y direction) during the tensile force transmission.

More precisely, the chain link includes two essentially disk-shaped side walls/chain links that are spaced apart from one another in parallel in a transverse direction (x direction) of the chain link and fixedly connected to one another. The transverse direction (x direction) corresponds to a direction transverse to a chain circulation direction. The chain link may be designed as an inner plate link or an outer plate link, for example. In the present invention, the inner plate links and the outer plate links are structurally identical with regard to the geometry of the side walls. The chain links, which are designed as an inner plate link or an outer plate link, differ solely by their connection members, and accordingly, by the distance between the side walls in the transverse direction (x direction). Due to the disk-shaped or panel-shaped design of the side walls, a particularly strong material may be used for the side walls, since forming of the material may be dispensed with. The side walls of the chain link according to the invention have a simple geometry, which despite the strong or high-strength material can be manufactured in one work step, for example by means of laser cutting. In addition, due to the simple design of the chain link, in particular the side walls, an economically manufacturable chain link may be provided.

The two side walls may preferably be fixedly connected to one another via two connection elements that are spaced apart in the longitudinal direction (z direction) of the chain link. The longitudinal direction (z direction) of the chain link corresponds to the chain circulation direction. In particular, the two side walls of the chain link may be connected to one another via connection members in the form of bolts or sleeves. According to one preferred embodiment, chain links designed as an inner chain member/inner plate link may be connected to one another via sleeves, and chain links designed as an outer chain member/outer plate link may be connected to one another via bolts.

The rabbet in the side walls may, in each case, have a support surface that is oriented essentially perpendicularly with respect to a vertical direction (y direction) of the chain link, the support surface being designed and provided for positioning the chain link at the conveyor plate of the chain conveyor in the vertical direction (y direction). In particular, the support surface is oriented upwardly, i.e., toward the conveyor plate, in the vertical direction (y direction), so that the conveyor plate may be easily supported in the gravitational direction/vertical direction.

A further rabbet in the side walls may be advantageously provided which is symmetrical with respect to the at least one rabbet. In each case a stud that is oriented in the vertical direction (y direction) of the chain link is formed by the arrangement of the two rabbets in the side walls.

According to an example, each stud may protrude from the support surface of the associated side wall. This has the advantage that the maximum insertion depth of the stud into the conveyor plate may be set by the positioning of the support surface. The stud may thus be easily inserted into the conveyor plate from below.

A rectangular or slotted recess, in each case extending in the thickness direction (x direction) of the side wall, may be formed in the side walls. In particular, the recess may be designed and provided for fastening the chain link to the conveyor plate of the chain conveyor in the vertical direction (y direction). That is, the recess is used to accommodate an intermediate element, via which the panel-shaped side wall is connectable to the conveyor plate in the vertical direction (y direction). The chain link may thus be secured in position in a particularly simple manner.

The recess may have an essentially rectangular cross section that extends in particular along the longitudinal direction (z direction). An upper edge of the recess, i.e., an outer edge in the chain circulation direction or an edge that is closest to the conveyor plate/the force transmission surface in the vertical direction (y direction), may preferably be situated in a shared plane with the support surface. This has the advantage that a component that is plate-shaped, for example, and that is inserted into the recess lies flatly against a component (such as the conveyor plate) resting on the support surface. During screwing to the conveyor plate, this avoids the need for spacers for screwing in the inserted component.

Edges of the recess may be spaced apart from outer edges of the side wall by at least the material thickness of the side wall, preferably by twice the material thickness or by three times the material thickness. For example, the recess is situated centrally in the side wall or centrally relative to the stud. This has the advantage that material weaknesses and stress peaks may be avoided.

For each recess the chain link may have a DIN-standardized shim/washer with a through hole for accommodating a fastening element. The fastening element, in particular in the form of a carriage bolt, is used to fasten the chain link to the conveyor plate in the vertical direction. The washer may preferably have a larger outer diameter than a longitudinal extension of the recess. In particular, the washer may be inserted into the associated recess in the transverse direction, preferably from the outside. That is, the washer engages with the recess/is accommodated in the recess (due to the larger outer diameter, only partially) in a form-fit manner. In other words, a standard washer that is loosely inserted into the recess may be used to screw the panel-shaped side walls of the chain link to the conveyor plate in the vertical direction. It is thus possible to implement a particularly simple and cost-effective approach for connection to the conveyor plate, which due to the transmission of force across the force transmission surfaces situated elsewhere may have a weakly dimensioned design. As a result of a washer being inserted from the outside in the transverse direction for each recess, the washers do not have to be fixed in the transverse direction, since shifting in one transverse direction is limited by the washer that is screwed to the conveyor plate, and shifting in the other transverse direction is limited by the washer that is screwed to the conveyor plate. If a washer is lost, a new washer may be used at little cost.

For each recess, the chain link may include a retaining element that has a main body and a stud section protruding from the main body. A through hole for accommodating a fastening element is formed in the main body. The fastening element, in particular in the form of a carriage bolt, is used to fasten the chain link to the conveyor plate in the vertical direction (y direction). The stud section may preferably be inserted into the associated recess, in particular from the outside, in the transverse direction (x direction). That is, the stud section engages with the recess/is accommodated in the recess in a form-fit manner. As a result of a retaining element being inserted from the outside in the transverse direction (x direction) for each recess, the retaining elements do not have to be fixed in the transverse direction (x direction), since shifting in one transverse direction (+x direction) is limited by the retaining element that is screwed to the conveyor plate, and shifting in the other transverse direction (−x direction) is limited by the retaining element that is screwed to the conveyor plate. In particular, the stud section may have a smaller width than the main body. As a result, the insertion depth is limited and the position in the transverse direction (x direction) is fixed.

The retaining element may have an essentially plate-shaped design. This has the advantage that the retaining element rests against a bottom side of the conveyor plate due to the position of the recess. The retaining element may preferably have the same thickness as the side wall. In particular, the retaining element may be made of the same material as the side wall. This has the advantage that the same starting material as for the side wall may be used. Due to the design with the high-strength material, it is also possible for the stud section to have a relatively small design, so that the recess for the stud section may in turn have a small design, so that there is sufficient material between the outer edges of the side wall and the recess.

A first transport retaining opening may be formed in the stud section, into which a transport retaining element for (temporarily) fastening the retaining element to the associated side wall is insertable in such a way that the transport retaining element engages behind material of the associated side wall, opposite the insertion direction of the stud section. Since the retaining element only needs to be loosely inserted into the associated recess, the retaining element may thus be prevented from falling out during transport or installation.

The chain link may include a retaining element that has a main body and two stud sections oppositely protruding from the main body. A through hole for accommodating a fastening element is formed in the main body. The fastening element, in particular in the form of a carriage bolt, is used to fasten the chain link to the conveyor plate in the vertical direction (y direction). The stud sections may preferably be inserted into each of the recesses, in particular from the inside, in the transverse direction (x direction). That is, one of the stud sections is inserted into one side wall in a form-fit manner, and the other of the stud sections is inserted into the other side wall in a form-fit manner. The main body is thus situated between the two side walls. This has the advantage that the retaining element cannot fall out of the side walls, and is thus captively mounted. In addition, with such a design it is necessary to provide only one fastening element. In particular, the stud sections may have a smaller width than the main body. As a result, the insertion depth is limited and the position in the transverse direction (x direction) is fixed.

The retaining element may have an essentially plate-shaped design. The retaining element may preferably have the same thickness as the side wall. In particular, the retaining element may be made of the same material as the side wall. This has the advantage that the same starting material as for the side wall may be used. Due to the design with the high-strength material, it is also possible for the stud sections to have a relatively small design, so that the recess for the stud sections may in turn have a small design, so that there is sufficient material between the outer edges of the side wall and the recess.

The side walls may be made of a steel having a material strength of 500 N/mm$^2$ to 1600 N/mm$^2$. The steel can have a material strength that is greater than 700 N/mm$^2$. Fine grained steels and abrasion-resistant steels, for example, have proven to be suitable materials. A particularly strong chain link may thus be provided which is suitable for transmitting high tensile forces. The problem with such high-strength steels is that they may be difficult to machine, and for example cannot be stamped. In particular, the side walls are therefore designed as laser-cut components or with a geometry that is producible by laser cutting. Alternatively, the component geometry may also be produced using comparable methods: abrasive water jet cutting and plasma cutting.

The object of the invention is further achieved by a kit made up of a described chain link and a conveyor plate of a chain conveyor. In particular, for each conveyor plate the kit can have two chain links that are spaced apart from one another in the transverse direction. For each side wall of each chain link, the conveyor plate has an insertion opening with which a portion of the side wall or the stud of the associated side wall engages in a form-fit manner for the direct transmission of force from the force transmission surface to the conveyor plate. The insertion opening may be designed in particular as a through opening (in the material thickness direction of the conveyor plate). This has the advantage that the insertion opening is producible by laser cutting. The insertion opening preferably has a rectangular shape, in particular in the form of a slot, the insertion opening cross section corresponding in particular to the stud cross section. In other words, for each chain link, two slots that are oriented in the longitudinal direction are formed in the conveyor plate, into which a portion of the side walls or the studs of the chain link are in each case inserted in a form-fit manner. The force transmission from the chain link to the conveyor plate thus takes place directly via the side walls and in the plane of the side walls (instead of via a support bracket or the like that protrudes in the transverse direction (x direction)). Due to the direct form-fit engagement of the side wall with the conveyor plate, the force transmission advantageously no longer takes place via a frictionally engaged connection using screws.

The chain link may be designed and coordinated with the conveyor plate in such a way that the stud ends in flush alignment with a surface of the conveyor plate, in particular a top side of the conveyor plate, i.e., a plate surface of the conveyor plate facing away from the chain link. That is, the stud in particular does not protrude beyond the surface. This has the advantage that a flattest possible surface is provided so that the likelihood of bulk material adhering is reduced.

The extension of the vertical edge of the rabbet in the side wall or of the stud in the vertical direction (y direction) may correspond to the material thickness of the conveyor plate. This has the advantage on the one hand that the side wall or the stud may end in flush alignment with the surface of the conveyor plate. On the other hand, this results in the advantage that the support surface of the chain link from which the stud extends/protrudes (for a completely inserted stud) rests against a bottom side of the conveyor plate, i.e., at a plate surface of the conveyor plate facing the chain link. At the same time, positioning in the vertical direction/chain height direction (y direction) is thus achieved.

The kit may include at least one fastening element for fastening the chain link to the conveyor plate in the vertical direction/chain height direction. The fastening element passes through a fastening opening in the conveyor plate as well as through the through hole in the chain link, i.e., through the washer or through the retaining element. The chain link is screwed to the conveyor plate in this way. The fastening opening is designed in particular as a through opening. The fastening element is preferably designed in the form of a carriage bolt whose head rests on the top side of the conveyor plate. It may thus be ensured, even if it is not possible to countersink the through opening due to the material strength of the conveyor plate, that the top side of the conveyor plate is as flat as possible, with only a slight overhang by the fastening element at which bulk material or dirt could accumulate. This in turn is important for the weighing accuracy and cleanliness of the conveyor plate, so that the risk of dirt falling off during the return of the conveyor belt is reduced.

For each side wall, the kit may include a fastening element, i.e., a total of two fastening elements for each chain link, the fastening elements being situated outside the insertion openings in the transverse direction (x direction), and each being screwed in with a washer/retaining element that engages from the outside with a recess in the side wall. The number of required fastening elements is thus reduced significantly compared to a DIN plate link chain, in which two fastening elements are provided for each side wall.

For each chain link the kit may include a fastening element, i.e., a total of one fastening element for each chain link, the fastening element being situated between the insertion openings in the transverse direction (x direction) and screwed to a retaining element that engages from the inside with both recesses in the side walls. That is, for each plate link chain only one track of carriage bolts in the chain circulation direction is necessary, so that less bulk material or dirt can accumulate at the top side of the conveyor plates. In addition, the number of required fastening elements is reduced significantly compared to a DIN plate link chain, in which two fastening elements are provided for each side wall.

The object of the invention is further achieved by a chain conveyor, for example, a slat conveyor. The chain conveyor includes a plurality of such kits, i.e., a plurality of conveyor plates and a corresponding number, preferably twice the number, of chain links. Neighboring chain links are articulatedly connected to one another in the chain circulation direction, which corresponds to the longitudinal direction (z direction) of the chain links, to form a plate link chain. The conveyor plates are drivable in the chain circulation direction via the plate link chain, i.e., the interconnected chain links.

In other words, the invention relates to a chain link for a plate link chain that is not based on the dimensions of a DIN plate link chain, but, rather, is designed without support brackets, laterally protruding from the side walls of the chain link, for connection to a conveyor plate of a slat conveyor. The chain link is positioned with respect to the conveyor plate in the vertical direction (i.e., in the chain height direction, y direction) and in the horizontal direction (i.e., in the chain circulation direction/longitudinal direction/z direction and in the transverse direction/x direction) by insertion tabs/studs and corresponding support surfaces at the chain link. The chain link is designed in such a way that the connection to the conveyor plate takes place via a slot/insertion opening in the conveyor plate into which the chain link with a portion of the side wall or a stud is inserted. The tensile force transmission takes place not via a frictionally engaged connection via components of the chain link protruding in the transverse direction (x direction), and thus via connected screws, but, rather, via a form-fit connection between the chain link (in particular the stud of the side wall) and the conveyor plate (in particular the insertion opening). Thus, the screw connection between the conveyor plate and the chain link does not take part in the transmission of tensile force. The positioning in the vertical direction (y direction) is achieved by a retaining element that is inserted in a form-fit manner into a slot/recess in the side wall of the chain plate, and the retaining element in turn is held by means of a screw in a corresponding opening in the conveyor plate. The screw connection serves only to hold the conveyor plate together with the retaining element in position in the vertical direction, in particular on the returning belt. A more weakly dimensioned screw and/or fewer screws may thus be used, which simplifies the installation and reduces the installation time and thus the costs. The retaining element may be designed in the form of a standardized shim/washer or a freely configured, in particular plate-shaped, component having a through hole. In the chain link, in each case a retaining element may be inserted into each side wall from the outside, or a retaining element may be inserted into both side walls from the inside (i.e., situated in between).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
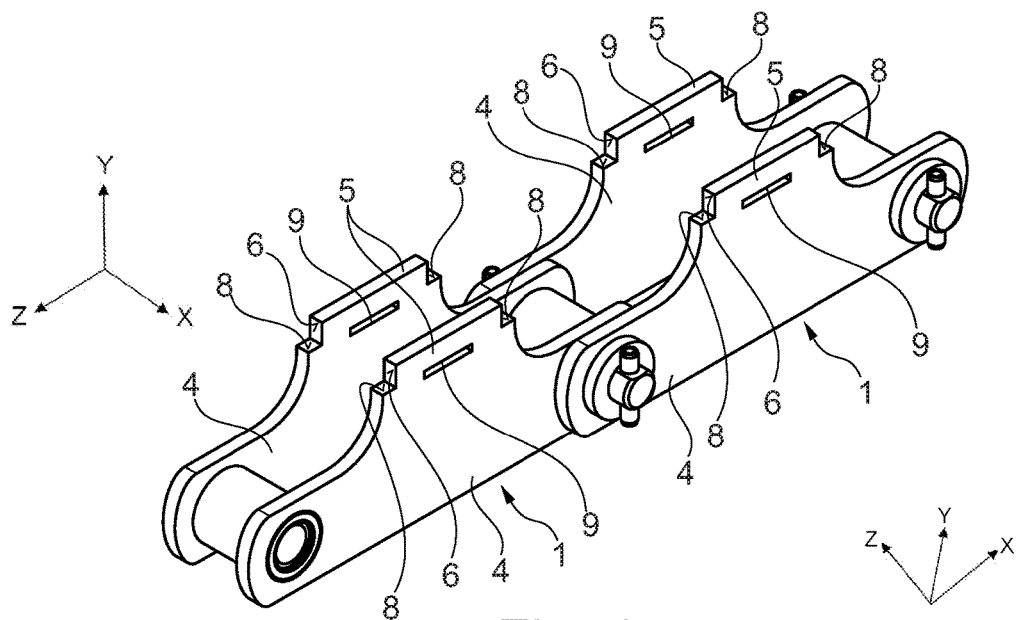
FIG. 1 shows a perspective illustration of two chain links according to the invention.
Figure 2:
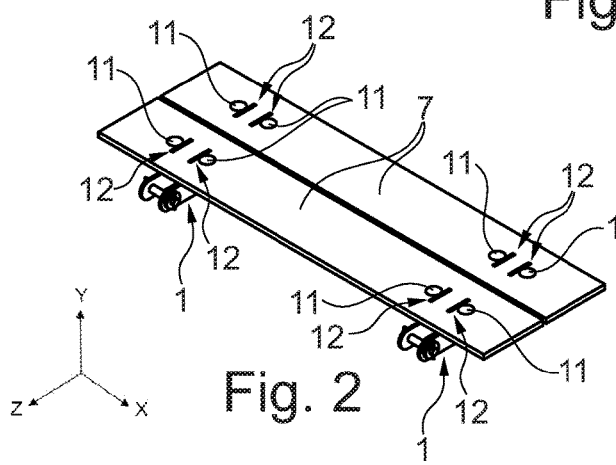
FIGS. 2 through 5 show various perspective illustrations of the two chain links and of two conveyor plates to which the chain links are fastened.
Figure 3:
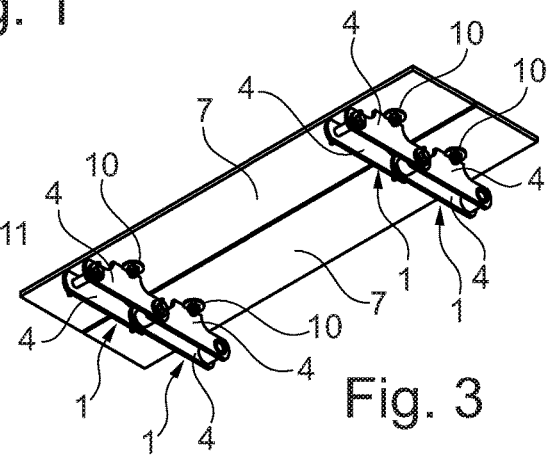
Figure 4:
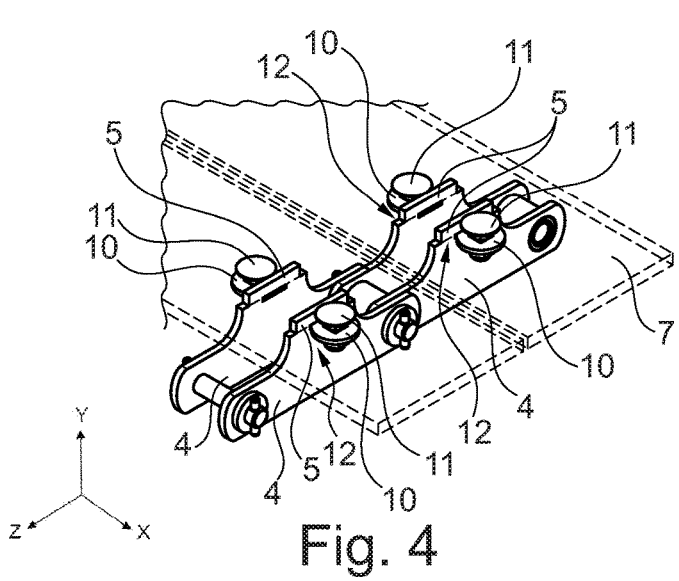
Figure 5:
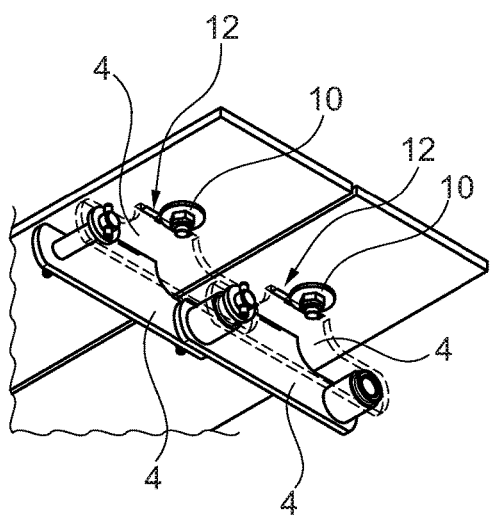
Figure 6:
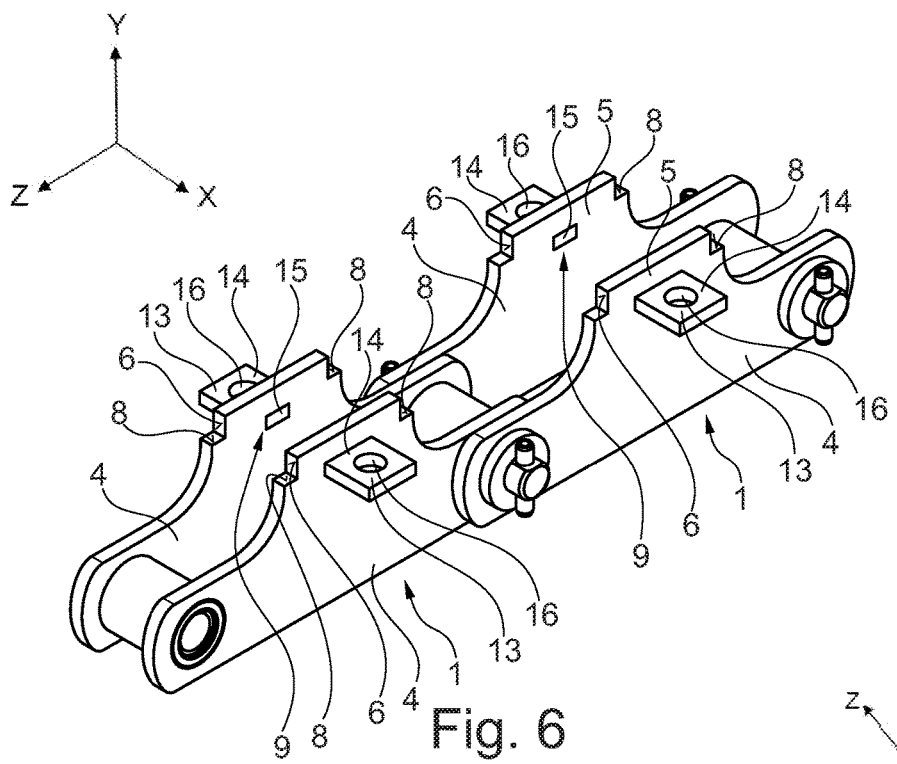
FIG. 6 shows a perspective illustration of two chain links according to the invention.
Figure 7:
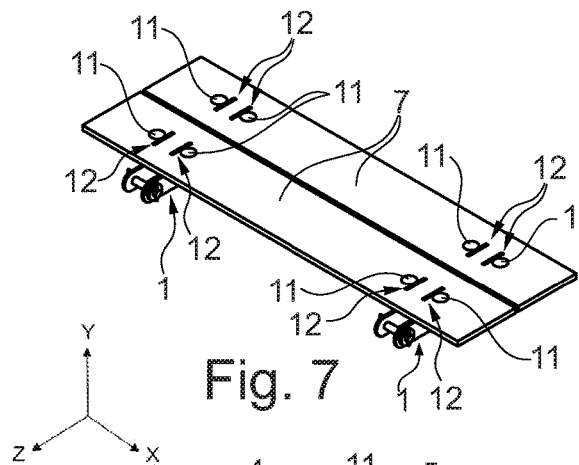
FIGS. 7 through 10 show various perspective illustrations of the two chain links and the two conveyor plates to which the chain links are fastened.
Figure 8:
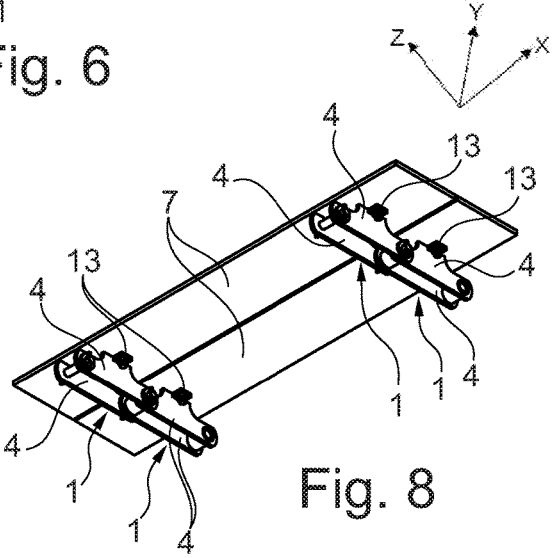
Figure 9:
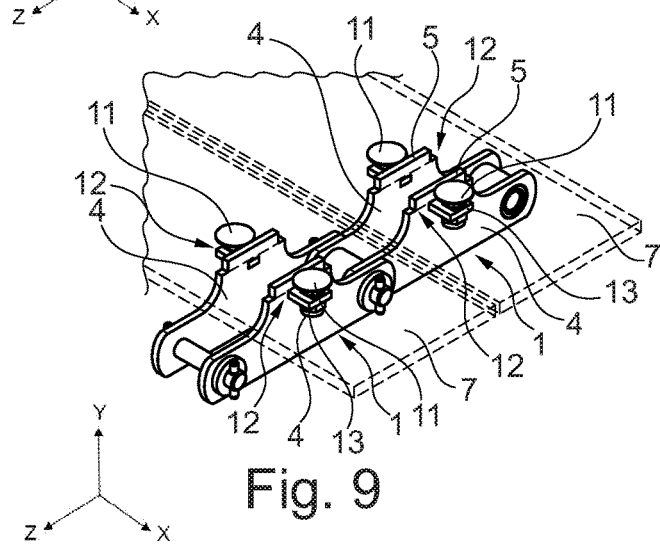
Figure 10:
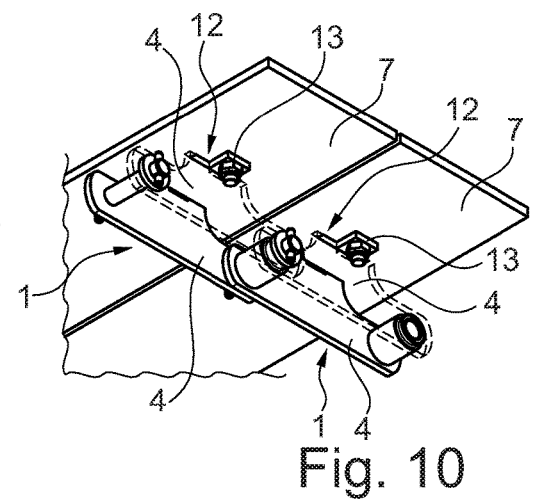
Figure 11:
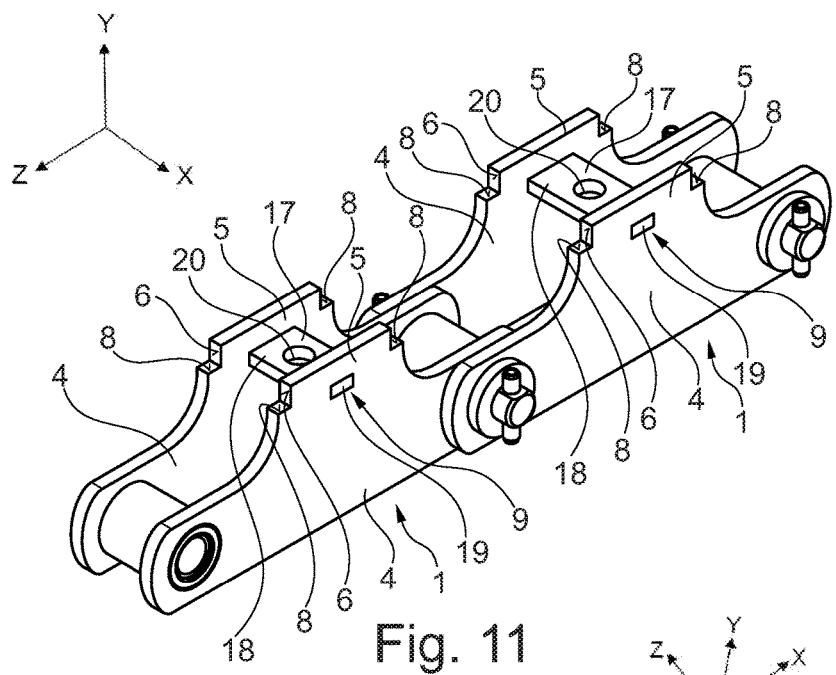
FIG. 11 shows a perspective illustration of two chain links according to the invention.
Figure 12:
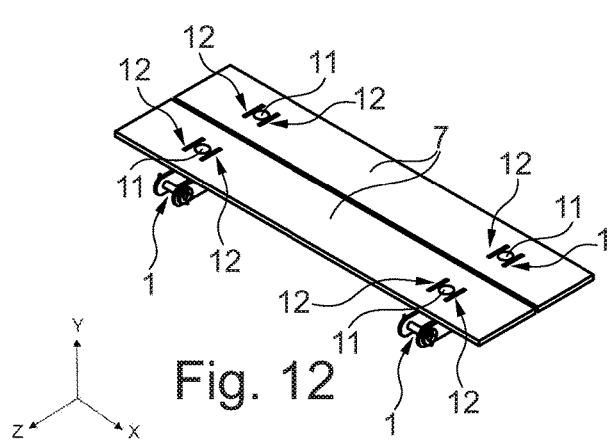
FIGS. 12 through 15 show various perspective illustrations of the two chain links and of the two conveyor plates to which the chain links are fastened.
Figure 13:
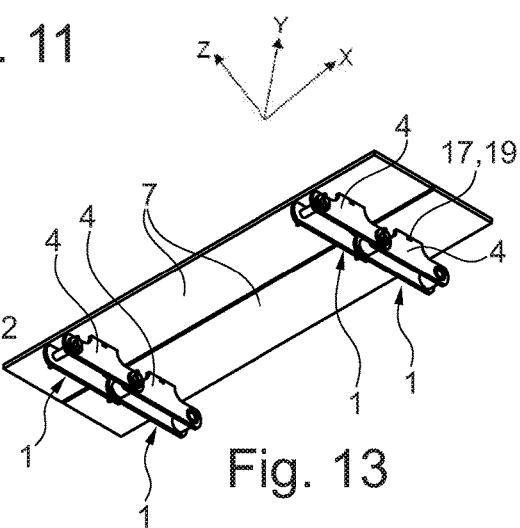
Figure 14:
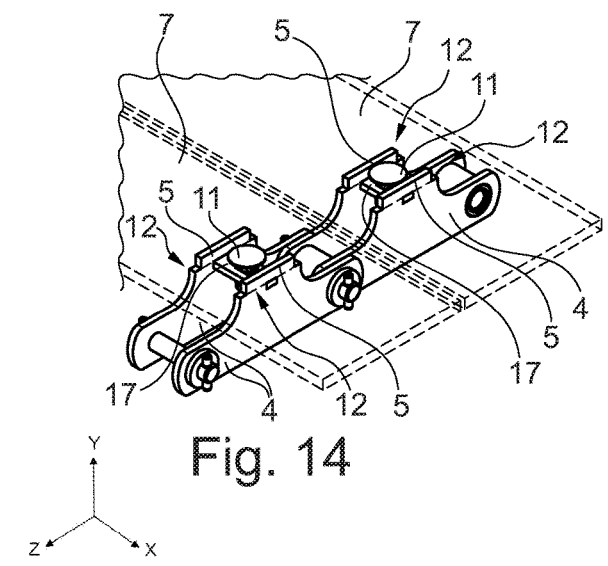
Figure 15:
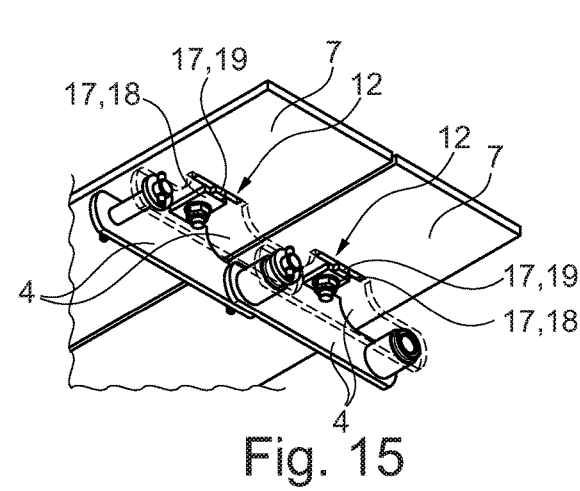

Two chain links 1 according to the invention are shown in FIGS. 1 through 5 in an example, in FIGS. 6 through 10 in a second example, and in FIGS. 11 through 15 in a third example. A plurality of such chain links 1 form a plate link chain 2 that is used in particular in a chain conveyor such as a slat conveyor 3, as illustrated in particular in FIG. 16.

The chain link 1 according to the invention has two essentially disk-shaped or panel-shaped side walls/chain links 4 that are spaced apart from one another in parallel in a transverse direction of the chain link 1 and fixedly connected to one another, preferably via two connection elements that are spaced apart from one another in parallel in a longitudinal direction (z direction) of the chain link. The longitudinal direction (z direction) of the chain link 1 corresponds to a chain circulation direction of the plate link chain 2. The transverse direction (x direction) of the chain link 1 thus corresponds to a direction transverse to the chain circulation direction.

The side walls 4 each include a main body and at least one rabbet at their upper edge, which in the side wall forms a force transmission surface 6 oriented essentially perpendicularly with respect to a longitudinal direction (z direction) of the chain link 1, and a support surface 8 oriented perpendicularly with respect to the vertical direction (y direction). A stud 5 that protrudes from the main body of the side wall 4 is formed by two symmetrically arranged rabbets. The stud 5 protrudes from the main body, in particular upwardly, in a vertical direction (y direction) of the chain link 1, i.e., outwardly as viewed in the chain circulation direction. For example, the stud 5 may be situated centrally in the side wall 4 in the longitudinal direction. A force transmission surface 6 is formed at the stud 5, and is oriented essentially perpendicularly with respect to the longitudinal direction (z direction) of the chain link 1. The force transmission surface 6 is a face of the chain link 1 on the outer circumferential side. According to the invention, the force transmission surface 6 is designed and provided for the direct and form-fit transmission of force to a conveyor plate 7 of the chain conveyor 3. In other words, an end face of the side wall 4 oriented perpendicularly with respect to the chain circulation direction forms a direct contact surface for the conveyor plate 7, so that a drive force is transmittable directly, i.e., without transfer via intermediate components such as a support bracket or the like, from the side wall 4 to the conveyor plate 7. Due to the disk-shaped or panel-shaped design of the side wall 4, the force transmission to the conveyor plate 7 takes place in the plane of the disk or of the plate of the side wall 4, so that no torque is induced in the transverse direction (x direction) and/or in a chain height direction/vertical direction (y direction).

The force transmission surface 6 is preferably also designed and provided for positioning the chain link 1 at the conveyor plate 7 of the chain conveyor 3 in the chain circulation direction. As a result of the force transmission surface 6 resting against the direct contact surface of the conveyor plate 7, a relative shift of the chain link 1 with respect to the conveyor plate 7 in the longitudinal direction (z direction) of the chain link 1 is limited. In other words, the force transmission surface 6 forms a stop surface in the chain circulation direction.

The side walls 4 each have a support surface 8 that is oriented essentially perpendicularly with respect to the vertical direction (y direction) of the chain link 1. That is, the support surface 8 is perpendicular to the force transmission surface 6. The support surface 8 is oriented upwardly in the vertical direction (y direction), i.e., outwardly as viewed in the chain circulation direction. The support surface 8 is a face of the chain link 1 on the outer circumferential side. The support surface 8 is designed and provided for positioning the chain link 1 at the conveyor plate 7 of the chain conveyor 3 in the vertical direction (y direction). The studs 5 protrude from the support surface 8 of the associated side wall 4. A first section of the support surface 8 is situated in front of the stud 5 in the chain circulation direction, while a second section of the support surface 8 is situated behind the stud 5 in the chain circulation direction. In other words, the stud 5 has a smaller cross section, in particular a smaller longitudinal extension, than the main body of the side wall 4, or than a portion of the side wall 4 at which the support surface 8 is provided.

A recess 9 that extends in the thickness direction (x direction) of the side wall 4 is formed in each of the side walls 4. The recess 9 is designed and provided for fastening the chain link 1 to the conveyor plate 7 of the chain conveyor 3 in the vertical direction (y direction). The recess 9 serves solely to hold the chain link at the conveyor plate 7 in the vertical direction (y direction), but not to transmit the drive force. In other words, the side wall 4 has two separate interfaces, one interface being used to transmit force from the side wall 4 to the conveyor plate 7, and the other interface being used to fasten the chain link 1 to the conveyor plate 7.

The recess 9 may preferably extend in the manner of a slot along the longitudinal direction (z direction) of the chain link 1. In particular, the recess 9 has an essentially rectangular cross section. The recess 9 may have a cross section that is constant in the thickness direction (x direction) of the side wall 4, or may taper in the thickness direction (x direction) of the side wall 4, in particular in the transverse direction from the outside to the inside. An upper edge of the recess 9, i.e., an outer edge in the chain circulation direction/ an upper edge in the vertical direction (y direction), may preferably be situated essentially in a shared plane with the support surface 8. The conveyor plate 7 resting on the support surface 8 thus at the same time rests on a plate-shaped component that is inserted into the recess 9.

The recess 9 may preferably be dimensioned in such a way that its edges, in particular its outer edges in the longitudinal direction (z direction), are spaced sufficiently far apart from an outer edge of the side wall 4, i.e., by at least the material thickness of the side wall 4, preferably by twice the material thickness, more preferably by three times the material thickness. For example, the recess 9 may be situated centrally in the longitudinal direction (z direction) in the side wall 4 or centrally relative to the stud 5. The recesses 9 of the two side walls 4 are in particular in flush alignment with one another.

Each side wall 4 may have a symmetrical design (with respect to a center axis viewed in the longitudinal direction (z direction)). The side walls of a chain link 1 may be designed as identical parts. In particular, the side walls 4 have a constant thickness.

The chain link 1 may include an intermediate element that is used for fastening the chain link 1 to the conveyor plate 7 in the vertical direction. In particular, the intermediate element may be designed as a washer 10, as in the first embodiment illustrated in FIGS. 1 through 5. The washer 10 may in particular be a DIN-standardized washer (DIN 9021). The washer 10 has a through hole in which a fastening element, for example in the form of a carriage bolt 11, may be accommodated. The washer 10 may thus be screwed to the conveyor plate 7. To fasten the washer 10 to the side wall 4, the washer is inserted, for example loosely, into the recess 9 in the associated side wall 4, in particular from the outside, in the transverse direction of the chain link 1. That is, the washer 10 engages with the recess 9 in a form-fit manner. The washer 10 has a larger outer diameter than a longitudinal extension of the recess 9. The thickness of the washer 10 preferably corresponds to the height of the recess 9. The washer 10 is thus partially accommodated in the recess 9 in the transverse direction, and due to the coordination of the dimensions in the vertical direction (y direction) and in the longitudinal direction (z direction) is connected to the side wall 4 in a form-fit manner. In particular, for each recess 9, i.e., for each side wall 4, the chain link 1 includes a washer 10, which in each case is inserted into the associated side wall 4 from the outside, i.e., in opposite directions along the transverse direction.

To transmit force from the chain link 1 to the conveyor plate 7, the chain link 1 and the conveyor plate 7 are connected to one another (see FIGS. 2 through 5). The conveyor plate 7 may preferably be designed as a rectangular, essentially flat plate having a length between 800 mm and 2400 mm and a width between 100 mm and 400 mm. For transmitting the drive force from the chain link 1 to the conveyor plate 7, for each stud 5, i.e., for each side wall 4, of the chain link 1 an insertion opening 12 is formed in the conveyor plate 7. The insertion opening 12 is designed as a through opening. To directly transmit force from the force transmission surface 6 to the conveyor plate 7, the stud 5 of the side wall 4 is inserted, for example loosely, into the associated insertion opening 12. That is, the stud 5 engages with the insertion opening 12 in a form-fit manner. The extension of the stud 5 in the vertical direction preferably corresponds to the thickness of the conveyor plate 7. That is, the stud 5 is preferably designed and coordinated with the conveyor plate 7 in such a way that it ends in flush alignment with a surface of the conveyor plate 7. The cross section of the insertion opening 12 preferably essentially corresponds to the cross section of the stud 5 of the side wall 4. That is, the insertion opening 12 preferably has a slotted/rectangular design. Due to the form-fit accommodation of the stud 5 in the insertion opening 12 or the selection of the same cross sections, the chain link 1 is fixedly positioned relative to the conveyor plate 5 in the horizontal direction, i.e., in the transverse direction (x direction) and the longitudinal direction (z direction) of the chain link 1.

An insertion depth of the stud 5 into the insertion opening 12 is limited due to the stud 5 extending from the support surface 8. That is, when the stud 5 is inserted, the chain link 1 with the support surface 8 rests against a bottom side of the conveyor plate 7. The chain link 1 is thus positioned in one direction in the vertical direction (y direction) relative to the conveyor plate 7.

To prevent the stud 5 from falling out of the insertion opening 12 (in particular in the area of the returning conveyor plates 7), the chain link 1, with the fastening element in the form of the carriage bolt 11, is fastened to the conveyor plate 7 (in the vertical direction/y direction). The connection via the carriage bolt 11 serves solely to position the chain link 1 or to absorb the weight force of the chain link 1, but not to transmit tensile force. For fastening in the vertical direction (y direction), the conveyor plate 7 has at least one through hole through which the carriage bolt 11 passes. A head of the carriage bolt 11 rests on the surface of the conveyor plate 7. The carriage bolt 11 likewise passes through the through hole in the intermediate part, in the form of the washer 10 in the first embodiment. The washer 10 and the conveyor plate 7 are screwed by means of the carriage bolt 11 through a lock nut that is affixed from below. Due to the arrangement of the recess 9, the intermediate part, in the first embodiment in the form of the washer 10, with the top side preferably rests against the bottom side of the conveyor plate 7. In the first embodiment of the chain link 1, a washer 10 is inserted in each case into the recess 9 in the associated side wall 4. The chain link 1 is thus fastened to the conveyor plate 7 via two carriage bolts 11, each of which passes through a washer 10.

The side walls 4 of the chain link 1 and/or the conveyor plates 7 may preferably be made of a steel having a material strength of 500 $N/mm^2$ to 1600 $N/mm^2$. The material strength of the side walls 4 is preferably greater than 700 $N/mm^2$. Fine grained steels and abrasion-resistant steels, for example, have proven to be suitable materials. Such high-strength steels cannot be machined by stamping. The side walls 4 of the chain link 1 and/or the conveyor plates 7 are designed in particular as components that are cut by laser, abrasive water jet, or plasma.

The second embodiment illustrated in FIGS. 6 through 10 has essentially the same features as the first embodiment, so that a repeated description of the identical features is dispensed with. The second embodiment differs from the first embodiment solely by the design of the recess 9 and of the intermediate element.

According to the second embodiment, the intermediate element is designed as a retaining element 13 having a main body 14 with a through hole 16 for accommodating the fastening element, here in the form of the carriage bolt 11, and a stud section 15 that protrudes from the main body 14. The main body 14 has a rectangular, in particular square, cross section in which the through hole 16 is centrally situated. The retaining element 13 preferably has an essentially plate-shaped design. In particular, the retaining element 13 has the same thickness as the side wall 4. The retaining element 13 is preferably made of the same material as the side wall 4. The stud section 15 is inserted into the associated recess 9, in particular from the outside, in the transverse direction of the chain link 1. That is, the stud section 15 engages with the recess 9 in a form-fit manner. In particular, the stud section 15 has a smaller width than the main body 14. When the stud section 15 is inserted into the recess 9, the main body 14 thus rests against the side wall 4 in a form-fit manner in the transverse direction. The recess 9 has the same cross section as the stud section 15. The longitudinal extension of the recess 9 preferably corresponds essentially to the diameter of the through hole 16, so that the edges of the recess 9 are spaced farther apart from the outer edges of the side wall 4 (compared to the first embodiment). In the second embodiment of the chain link 1, in each case a retaining element 13 is inserted into the recess 9 in the associated side wall 4. The chain link 1 is thus fastened to the conveyor plate 7 via two carriage bolts 11, each of which passes through the through hole 16 in the retaining element 13.

Although this is not illustrated, a first transport retaining opening may be formed in the stud section 15, into which a transport retaining element for (temporarily) fastening the retaining element 13 to the associated side wall 4 is insertable in such a way that the transport retaining element engages behind material of the associated side wall 4, opposite the insertion direction of the stud section 15.

The third embodiment illustrated in FIGS. 11 through 15 has essentially the same features as the first and the second embodiment, so that a repeated description of the identical features is dispensed with. The third embodiment differs from the first and the second embodiment solely in the design of the recess 9 and of the intermediate element, and in the number of intermediate elements per chain link 1, and accordingly, the number and arrangement of the through holes in the conveyor plate 7 or of the carriage bolts 11.

According to the third embodiment, the intermediate element is designed as a retaining element 17 having a main body 18 with a through hole 20 for accommodating the fastening element, here in the form of the carriage bolt 11, and two stud sections 19 that protrude from the main body 18 in opposite directions. The main body 18 has a rectangular cross section in which the through hole 20 is centrally situated. The retaining element 17 preferably has an essentially plate-shaped design. In particular, the retaining element 17 has the same thickness as the side wall 4. The retaining element 17 is preferably made of the same material as the side wall 4. Each of the stud sections 19 is inserted into the respective recess 9, in particular from the inside, in the transverse direction. That is, one stud section 19 engages with the recess 9 in one side wall 4 in a form-fit manner, and the other stud section 19 engages with the recess 9 in the other side wall 4 in a form-fit manner. In particular, the stud sections 19 have a smaller width than the main body 18. When the stud sections 19 are inserted into the recess 9, the main body 18 thus rests against the side wall 4 in a form-fit manner in the transverse direction. Thus, the main body 18 in the installed state is situated between the two side walls 4. The recesses 9 have the same cross section as the stud sections 19. The longitudinal extension of the recess 9 preferably corresponds essentially to the diameter of the through hole 20, so that the edges of the recess 9 are spaced farther apart from the outer edges of the side wall 4 (compared to the first embodiment). In the third embodiment of the chain link 1, exactly one retaining element 17 which engages with both recesses 9 is provided in the chain link 1. The chain link 1 is thus fastened to the conveyor plate 7 via only one carriage bolt 11 which passes through the through hole 20 in the retaining element 17. For accommodating the carriage bolt 11, the through hole in the conveyor plate 7 is accordingly situated between the two insertion openings 12.

In FIGS. 2 through 5, FIGS. 7 through 10, and FIGS. 12 through 15, in each case two conveyor plates 7 are illustrated by way of example, each being connected to two chain links 1 that are spaced apart in the width direction of the conveyor plate 7. The neighboring chain links 1 in the chain circulation direction are articulatedly connected to one another. The slat conveyor 3 has a plurality of such conveyor plates 7 and a plurality of such chain links 1, and is described by way of example with reference to FIG. 16.

Figure 16:
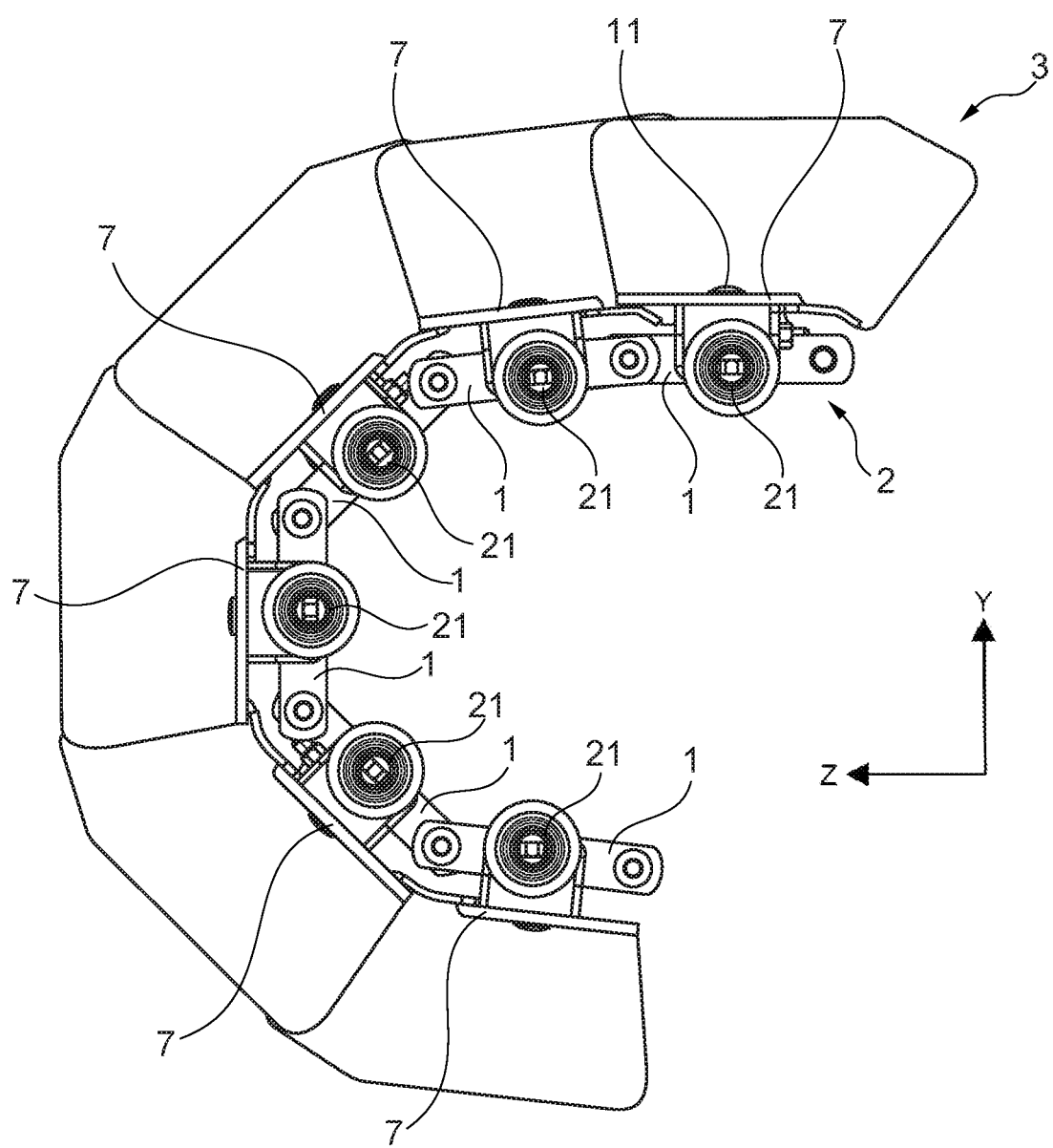
FIG. 16 shows a schematic side view of a portion of a slat conveyor.

FIG. 16 shows a schematic side view of the slat conveyor 3. The neighboring chain links 1 in the chain circulation direction are articulatedly connected to one another to form the plate link chain 2. The conveyor plates 7 are drivable in the chain circulation direction via the plate link chain 2, i.e., via the interconnected chain links 1. With the carriage bolts 11, the chain links 1 are fastened to the conveyor plates 7 in the vertical direction (y direction). In addition, the slat conveyor 3 includes nondrivable rollers 21 via which the weight of the bulk material to be conveyed via the conveyor plates 7 may be accommodated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A chain link for a plate link chain of a chain conveyor, the chain link comprising:
    two side walls that are spaced apart from one another in parallel in a transverse direction of the chain link and fixedly connected to one another, the two side walls each including at least one rabbet,
    wherein the at least one rabbet includes a force transmission surface oriented essentially perpendicularly with respect to a longitudinal direction of the chain link, the force transmission surface being designed and provided for a direct transmission of force to a conveyor plate of the chain conveyor, and
    wherein the two side walls are formed as identical parts and each have a constant thickness.

2. The chain link according to claim 1, wherein the at least one rabbet is formed of two surfaces, a first one of the two surfaces being the force transmission surface and a second one of the two surfaces being a support surface that is oriented perpendicularly with respect to a vertical direction of the chain link, the support surface positioning the chain link at the conveyor plate of the chain conveyor in the vertical direction.

3. The chain link according to claim 2, wherein the force transmission surface and the support surface are planar surfaces that are oriented perpendicular to one another.

4. The chain link according to claim 1, wherein the at least one rabbet includes a first rabbet and a second rabbet that is symmetrical with respect to the first rabbet, the first rabbet and the second rabbet both being provided in each of the two side walls and being spaced apart from one another in the longitudinal direction of the chain link, such that a stud is formed between the first rabbet and the second rabbet that is oriented in the vertical direction of the chain link.

5. The chain link according to claim 1, wherein each of the two side walls has a recess that extends in a thickness direction of the two side walls, the recess being designed and provided for fastening the chain link to the conveyor plate of the chain conveyor in the vertical direction.

6. The chain link according to claim 5, wherein the at least one rabbet is formed of two surfaces, a first one of the two surfaces being the force transmission surface and a second one of the two surfaces being a support surface that is oriented perpendicularly with respect to a vertical direction of the chain link, the support surface positioning the chain link at the conveyor plate of the chain conveyor in the vertical direction, and
    wherein the recess has an essentially rectangular cross section, and wherein an upper edge of the recess is arranged in a shared plane with the support surface.

7. The chain link according to claim 5, wherein, for each recess, the chain link has a washer with a through hole for accommodating a fastening element, the washer having a larger outer diameter than a longitudinal extension of the recess, and the washer being inserted into the recess in the transverse direction.

8. The chain link according to claim 5, wherein, for each recess, the chain link includes a retaining element that has a main body with a through hole for accommodating a fastening element, and a stud section protruding from the main body, the stud section being inserted into the recess in the transverse direction and having a smaller width than the main body.

9. The chain link according to claim 5, wherein the chain link comprises a retaining element that has a main body with a through hole for accommodating a fastening element, and two stud sections protruding from the main body, each of the stud sections being inserted into a respective recess of the two side walls in the transverse direction and having a smaller width than the main body.

10. The chain link according to claim 1, wherein the two side walls are made of a steel having a material strength of 500 N/mm$^2$ to 1600 N/mm$^2$.

11. The chain link according to claim 1, wherein the at least one rabbet is provided at an upper edge of each of the two side walls.

12. The chain link according to claim 1, wherein along an entire length of each of the two side walls in the longitudinal direction of the chain link, each of the two side walls has the constant thickness.

13. A kit comprising:
    a chain link; and
    a conveyor plate of a chain conveyor,
    wherein the chain link includes two side walls that are spaced apart from one another in parallel in a transverse direction of the chain link and fixedly connected to one another, the two side walls including at least one rabbet that has a force transmission surface oriented essentially perpendicularly with respect to a longitudinal direction of the chain link, the force transmission surface being designed and provided for a direct transmission of force to the conveyor plate of the chain conveyor, and
    wherein, for each of the two side walls of the chain link, the conveyor plate has an insertion opening with which a portion of each respective side wall or a stud of each respective side wall engages in a form-fit manner for directly transmitting force from the force transmission surface to the conveyor plate.

14. A chain conveyor comprising a plurality of kits according to claim 13, wherein neighboring chain links in a chain circulation direction are articulatedly connected to one another to form a plate link chain, and wherein the conveyor plates are drivable in the chain circulation direction via the plate link chain.

15. The chain conveyor according to claim 14, wherein the chain conveyor is a slat conveyor.

* * * * *